United States Patent [19]

Lee

[11] Patent Number: 5,308,804
[45] Date of Patent: May 3, 1994

[54] MOVING DISKS MADE OF SEMICONDUCTOR NANOCRYSTALLITE EMBEDDED GLASS

[76] Inventor: Huai-Chuan Lee, 1063 Cornell Ave., Albany, Calif. 94706

[21] Appl. No.: 991,490

[22] Filed: Dec. 15, 1992

[51] Int. Cl.$^5$ .............................................. C03C 8/14
[52] U.S. Cl. ........................................ 501/17; 501/32; 501/67; 252/301.4 F; 252/301.6 F
[58] Field of Search ................... 372/20; 252/301.4 F, 252/301.6 F; 501/5, 17, 32, 65, 67

[56] References Cited

U.S. PATENT DOCUMENTS

| | | | |
|---|---|---|---|
| 4,396,720 | 2/1983 | Beall et al. | 501/5 |
| 4,403,324 | 9/1983 | Wuste | 372/54 |
| 4,661,284 | 4/1987 | Cook et al. | 252/301.4 |
| 5,087,388 | 2/1992 | Koch | 252/301.17 |
| 5,120,970 | 6/1992 | Buchanan et al. | 250/483.1 |

Primary Examiner—Helene Klemanski
Assistant Examiner—Chris Gallo

[57] ABSTRACT

This invention modifies the microstructure of semiconductor nanocrystallite embedded glass by following a prescribed process schedule, so that it can be a solid state laser active medium. The crystalline phase of the glass consists of uniformly dispersed nanometer size single crystals which belong to one of the following semiconductor compounds: $ZnS_xSe_{1-x}$, $CdS_xSe_{1-x}$, $ZnS_xTe_{1-x}$, $ZnSe_xTe_{1-x}$, $CuCl_xBr_{1-x}$, InP, $Al_xGa_{1-x}As$, GaInAsP, AlGaAsSb, InAsSbP, and AlGaInP, where x=0 to 1.

Some of the semiconductor nanocrystallite embedded glass has a tunable range which overlaps that of the visible dye lasers, therefore it can be used as a replacement for the existing liquid dyes as the active media utilized in the tunable dye laser systems.

6 Claims, 5 Drawing Sheets

MOVING DISKS MADE OF SEMICONDUCTOR NANOCRYSTALLITE EMBEDDED GLASS

BACKGROUND OF THE INVENTION

The present invention pertains to how to produce and to use semiconductor nanocrystallite embedded glass as a tunable laser active medium. Most tunable lasers use liquid solutions of organic dyes as active lasing media. Since the wavelength, bandwidth, or pulse length of the tunable dye laser can be varied within a range using different dyes in combination with proper optical resonantor designs, the dye laser has been a major workhorse in the advancement of laser spectroscopy. However, the dye molecules react photochemically upon irradiation causing material degradation problems. The design which uses a stable region of a thin dye solution film through a jet nozzle as the active lasing host has lessened the photochemical degradation problem. However, the stability of the jet is still of concern, because it can not be ensured. In addition, the maintenance of the liquid dye circulation system and occasional change of dye solutions demands skilled technical support. Therefore, the search for solid state variants to replace the liquid tunable dye lasers is attractive. Organic dye impregnated polymer or glass as replacement for the dye solution has been considered but so far no product has been developed. The problems are mostly in the area of light induced dye chemical changes at the dye solution/host interface upon irradiation. Recently, Ti-Saphire has been introduced as a tunable solid state laser host. It is tunable in dye laser wavelengths. But the price of Ti-Saphire is high and its tunable range is narrow. It is still far from being able to replace the dye laser.

The semiconductor nanocrystallite embedded glass can be categorized as one of the glass/crystallites composites because it contains more than one phase. The semiconductor crystallite embedded glass is photorefractive due to its high $\chi^{(3)}$ values. The potential application in holographic data storage, and phase conjugation using this glass has been considered. Some of the semiconductor crystallite embedded glass has been used as a sharp cut-off filter in the optical industry for years. The photoluminescence properties of the sharp cut-off filters has been studied and published before. But no attention has been paid to their potential as tunable laser host materials. This invention modifies the microstructure of the semiconductor nanocrystallite embedded glass so that it can be a practical alternative for replacing the liquid dye in tunable lasers.

The semiconductor nanocrystallite embedded glass contains two distinctly different phases. The glassy phase is composed largely of silicate tetrahedra networks which serve as structural support and transparent window for the semiconductor crystalline phase. The crystalline phase is composed of numerous semiconductor single crystals which are referred to as nanocrystallites here. It is the nanocrystallite which serves as the laser active media. The lasing property of the nanocrystallite is dictated by its composition and its microstructure. The composition determines its peak wavelength of flourescence, and the microstructure determines its fluorescence bandwidth. The microstructure of semiconductor nanocrystallite can be characterized by the size distribution, number density, and the spatial distribution within the glass matrices. Due to the isotropic nature of the glass structure, the orientation of the nanocrystallite is random. Usually, compound semiconductor crystals belong to wursite or zincblend structure and are likely to have direct band gaps. Compound semiconductor single crystals have definite band gap energy depending on the relative chemical composition of the compounds and their orientations. If one assumes that each crystallite resembles a spherical particle, the relative composition, x, varies along its axis. The value of x is the smallest at the core and it increases along the axis. The range of variation is small but is critical for the emission efficiency.

Each of the compound semiconductors possesses a characteristic band gap energy. The magnitude of the band gap energy correlates to a specific wavelength edge below which the irradiation will be absorbed. For instance, zinc sulfide selenide ($ZnS_xSe_{1-x}$) absorbs any irradiation wavelength shorter than 450 nm. The shifting of the edge can be obtained by varying the value of x. Optically pumped single crystal platlets used as a laser host have been reported at cryogenic temperatures. The high refractive index of the bulk and high absorption coefficient at fluorescent wavelength hinders the further development of the optically pumped single crystal compound semiconductor.

The semiconductor nanocrystallite embedded glass possess a strong absorption of photons with energy greater than the band gap energy of the nanocrystallite. In contrast to the compound semiconductor single crystal, it has a smaller refractive index and a very low absorption in flourescence wavelength. These factors facilitate conditions favorable for laser application. Dispersed nanocrystallite with each single crystal sizes smaller than 20 nm will prevent concentrated absorption and subsequential heating. Consequently, the penetration depth in the glass ceramics increases and so does the pumping efficiency. The absorbed energy generates electron-hole pairs within the semiconductor nanocrystallite. The generated electrons and holes migrate according to the local electrical field, since there is no net external electrical field imposed on the material, the generated electrons and holes migrate in pairs and are subject to random fluctuation of the local environment. Consequently, the electron and hole pairs recombine and annihilate each other at a characteristic rate called the spontaneous recombination rate. At the same time, photons are emited with a wavelength range corresponding to the energy differences between the recombining pairs of electrons and holes. The emitted photons stimulate further electron hole pair recombinations and facilitate the neccessary coherence for lasing. The emission wavelength is usually longer than that of absorption. This prevents resonant absorption at band gap energy and avoids bleaching of the material. The emission spectrum can be characterized using two parameters: first, full width at half maximum (FWHM), and second, the peak wavelength. For instance, $ZnS_xSe_{1-x}$ (x=0.09) nanocrystallite embedded glass has photoluminescence spectrum of FWHM=50 nm, and peak at 520 nm. The inhomogeneous broadening of the spectrum is due to the random orientation of the crystallites. This is the major factor which contributes to the wavelength tunability of the lasers.

The size distribution, the spatial distribution, and the number density of the semiconductor nanocrystallite within the glass matrices, and the relative constituents composition (i.e., spatial distribution of x) within each semiconductor nanocrystallite are major attributes for tunable laser application using semiconductor nanocrystallite embedded glass as hosts. This invention provides process information for producing optimized semiconductor nanocrystallite embedded glass. In addition, it also provides the preferred geometrical design of the semiconductor nanocrystallite embedded glass for replacing organic dye solution in a tunable dye laser.

SUMMARY OF THE INVENTION

The flourescent property of the semiconductor crystallite embedded glass has been acknowleged but its potential application as a laser host is not explored. The previous applications of the glass only partially utilized its optical properties (either absorption or nonlinearity at transmission), and there is no need to optimize the microstructure to accomodate both absorption and stimulated emission properties required for the lasing application. This invention modifies the microstructure of the glass by controlling its forming process variables so that it can be utilized as a laser active medium.

The composition range of the semiconductor nanocrystallite embedded glass is listed as follows:

$SiO_2$ ... 40 to 75 wt %
$B_2O_3$ ... 0 to 50 wt %
$Li_2O$ ... 0 to 15 wt %
$Na_2O$ ... 0 to 15 wt %
$K_2O$ ... 0 to 15 wt %
semiconductor materials ... 0.0001 wt % to 2.0 wt %

The semiconductor materials can be one of the following compounds: $ZnS_xSe_{1-x}$, $CdS_xSe_{1-x}$, $ZnS_xTe_{1-x}$, $ZnSe_xTe_{1-x}$, $CuCl_xBr_{1-x}$, InP, $Al_xGa_{1-x}As$, GaInAsP, AlGaAsSb, InAsSbP, and AlGaInP, where $x = 0$ to 1. The glass matrices serve as a structural support for the nanocrystallite which is the de facto lasing active medium. The size distribution, the number density per unit volume, and the dispersion of the nanocrystallite are critical parameters for obtaining the radiative transition efficiency required by lasing applications. A carefully designed and controlled cooling process after the melting and homogenizing of the glass will be implemented to control the semiconductor nucleation rate and density. The subsequent annealing schedule will fine tune the size distribution of the semiconductor nanocrystallite within the glass matrices. Finally, the process will produce the glass composites with the optimum values of the aforementioned parameters.

The glass ceramics can be fabricated into disk shapes. A glass ceramic disk can be inserted into the resonator to replace the dye jet in a tunable dye laser system. The disk can be mounted onto a moving means which functions as an energy distributor allowing steady state energy transport to occur during operation. The moving means can be one of the following three designs: rotation, reciprocation, and vibration as long as the total optical path length of the host within the resonator is kept constant during operation. To reduce loss due to surface reflection, we can consider two options, first, orient the disk so that the cavity alignment intersects the disk with the Brewster angle. Second, antireflective coatings are applied on the surface. The former is the preferred arrangement.

DESCRIPTION OF THE PREFERRED EMBODIMENTS

Figure 1:
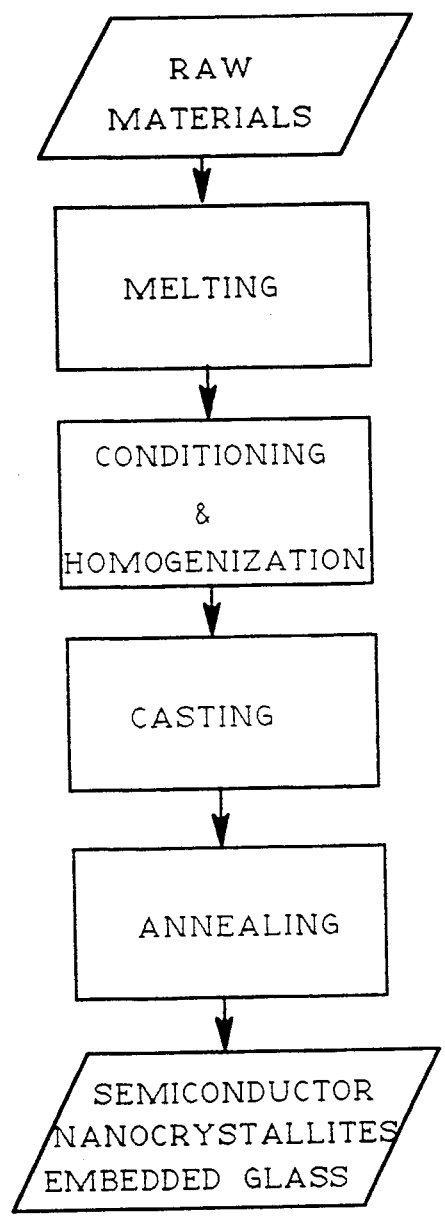
FIG. 1. A flow chart for the semiconductor nanocrystallite embedded glass forming process.
Figure 2:
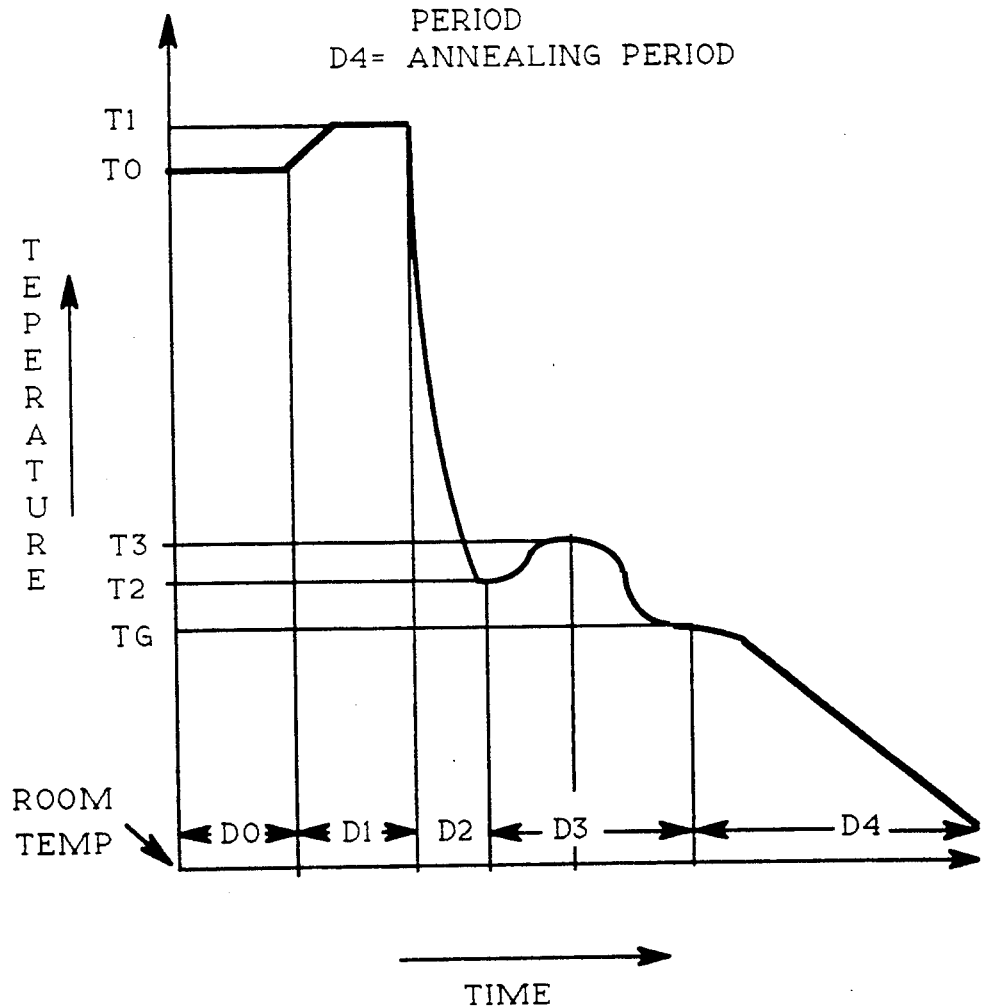
FIG. 2. The generalized thermal history for forming the semiconductor nanocrystallite embedded glass.

To produce the semiconductor nanocrystallite embedded glass with desirable microstructures depends on the following process variables: melt temperature, conditioning time, casting temperature, and subsequent annealing schedule. The flow chart shown in FIG. 1 illustrates the glass making process step by step. A temperature versus time plot shown in FIG. 2 indicates the critical operating variables along the process history. The composition of the melt is largely borosilicate glass with a small amount of dissolved zinc ions, sulfur ions, and selenium ions. The proportionality of the sulfur ions can be adjusted with atmospheric control of the glass furnace. Homogenization of the glass melt is critical and should be operated at a high enough temperature (i.e., above 1250° C.) to ensure the uniform distribution of ionic species in the melt. The cooling down rate should be so fast that homogeneous nucleation of the compound semiconductor precipitates with a high number density and small size would occur. The homogeneous nucleation of the compound semiconductor precipitates within the glass melt is driven by the free energy change during cooling. In isobaric condition, the free energy at temperature T1 where solutes are completely dissolved is G1, and it can be represented by the following equation: $G1 = (V_s + V_l)G_v^l$, where $V_s$ and $V_l$ are the volume occupied by the solute and the solvent respectively, and $G_v^l$ is the specific free energy of the solution in glassy phase. The free energy of the same system at T2 where the solute supersaturates is G2, and G2 can be represented by the following expression: $G2 = V_sG_v^s + V_lG_v^l + A_{sl}\gamma_{sl}$, where $G_v^s$ is the specific free energy of the crystalline precipitates phase, and $A_{sl}$ = interface area, and $\gamma_{sl}$ = interfacial tension between precipitates and the melt. The free energy change for the system cooled down from T1 to T2 is $\Delta G = G2 - G1 = -V_s\Delta G_v + A_{sl}\gamma_{sl}$. Assuming that a typical precipitate is spherical in shape with a radius r, we can write that $\Delta G = -(4/3)\pi r^3 \Delta G_v + 4\pi r^2 \gamma_{sl}$. The critical precipitate radius r* delineates the onset of the crystal growth and can be derived by letting $d\Delta G/dr = 0$. So, $r^* = 2\gamma_{sl}/\Delta G_v$. The activation energy $\Delta G^*$ is required to obtain the stable nuclei of the precipitates. It can be derived by substituting r* for r, then $\Delta G^* = (16/3)\pi \gamma_{sl}^3/(\Delta G_v)^2$. The critical nuclie radius is important for producing nanocrystallites with a desirable number density and spatial distribution. A high number density correlates to a small value of critical nulei radius which can be achieved by either increasing $\Delta G_v$ or by decreasing interfacial tension. The latter can not be usually obtained in the cooling process, so we concentrate on enlarging the value of $\Delta G_v$ for minimizing the critical nuclei size. In an undercool condition, $\Delta G_v = -\Delta S \Delta T + ((\Delta H + \Omega)/R)(\Delta T/(T1T2))$, where undercool $\Delta T = T2 - T1$, $\Delta S$ is the difference in entropy between the semiconductor dissolved in glass and the semiconductor nanocrystallite precipitated, $\Delta H$ is the difference in enthalpy between them, $\Omega$ is the heat of precipitation, and R is the ideal gas constant. The homogeneous nucleation rate at a given undercooling can be expressed by the following equation: $N_h = \omega C_0 \exp(((16/3)\pi\gamma_{sl}^3/(-\Delta S\Delta T+((\Delta H+\Omega)/R)(\Delta T/(T1\cdot T2)))^2)/(R\cdot T2))$, where $N_h$ is the homogeneous nucleation rate at T2, $\omega$ is the frequency of a critical nucleus receiving a precipitating compound from the glass melt. It depends on the surface area of the nucleus and the diffusion coefficient of the ionic species of the compound. The diffusion coefficient of ionic species depends on the viscosity of the glass melt. An activation energy usually is required to initiate the precipitation, and it provides a control for the process to proceed at the designated temperature. The homogeneous nucleation rate is approximately proportional to $\exp(-1/(\Delta T)^2)$. We want the phase separation to occur at a low enough temperature where the diffusion coefficient is low and only the small precipitate clusters can be formed locally. Using the theoretical arguments derived, we can find the designated temperature where the desirable density and size distribution of the semiconductor nanocrystallite can be obtained. The means to induce the spontaneous homogeneous nucleation is important in order to produce a uniform spatial distribution of the semiconductor nuclei. Pure homogeneous nucleation may not exist in reality. The closest means would be sending the shock wave through the under cooled solution. For example, one can use interferencing acoustic waves to induce higher probabilities for nucleus formation at high intensity interference nodes within the bulk of the solution. This increases the overall mean cluster size within a narrow size distribution. We know that when the cluster size is greater than the critical value, the cluster becomes stable. Ideally, we can keep the glass at T2 until the equilibrium phase separation condition is obtained. However, it may take too long. We can keep the glass at T2 for a period of time, D'2, so that the number density of the precipitates is stable. D'2 can be derived by assuming an acceptable margin of the precipitates size ($\Delta x$) upon the critical nuclei size at temperature T2. For instance if $\Delta x = 0.2(r^*)$, then $D'2 \sim 0.04 r^{*2}/D$, where $r^*$ = the critical nuclei size at T2, and D = diffusion coefficient of semiconductor ionic species in glass at T2. Further controlled heat treatment schedule is designed aimed at preserving the number density and growing the nanocrystallite in a practical time frame. The glass may be reheated up to a temperature T3 for a period of D3 before cooling down to the glass transition temperature (Tg). The temperature T3 should not be more than 75° C. above T2, and the duration, D3, should be so chosen that the diffusion length does not exceed half of the average interprecipitate distance. The glass transition temperature delineates the quasi-equilibrium state of the glass matrices. Further cooling does not alter the microstructure of the semiconductor precipitates and the long range structure of the networks. The cooling rate should be so designed that only the minimum amount of residue internal stress remain within the glass.

For example, optical glass with the composition of $SiO_2$ 42 wt %, $Na_2O$ 12 wt %, $K_2O$ 10 wt %, $B_2O_3$ 15 wt %, and $CdS_xSe_{1-x}$ 0.3 wt % can be melted with a mix of proportioned high purity raw materials using common optical glass making techniques. The melt temperature is preferably kept above 1250° C. for 2 to 4 hours until no crystalline compound is stable. Homogenization of the melt is obtained by stirring it mechanically with stirrers and at the same time bubbling it with oxygen with a trace amount of $SO_2$ for at least one half hour. After homogenization, one starts to quench the melt down to T2 (i.e., 725° C.) and keep the melt at T2 for D'2 hours (e.g., D'2~0.65 hour). Temperature uniformity is important here. The quench is done by casting the melt in a preheated and temperature controlled mold. The cast is preferably in a slab geometry with the smallest dimension (i.e., thickness) no more than 15 mm. The subsequent heat treat process involves heating up the cast up to 775° C. in a rate of 2° C./hr, then keeping it at 775° C. for 0.5 to 2 hour before cooling it down to glass transition temperature, Tg (~500° C.), in a cooling rate of 1° C./hr. When the cast is cooled below Tg the rate of nucleation and growth of nanocrystallit within the glass becomes neglibible. The final cooling stage follows the stress annealing process of glass articles known to the skilled of the art. The final form of the $CdS_xSe_{1-x}$ embedded glass should be yellow in color and should be internal stress free.

Figure 3:
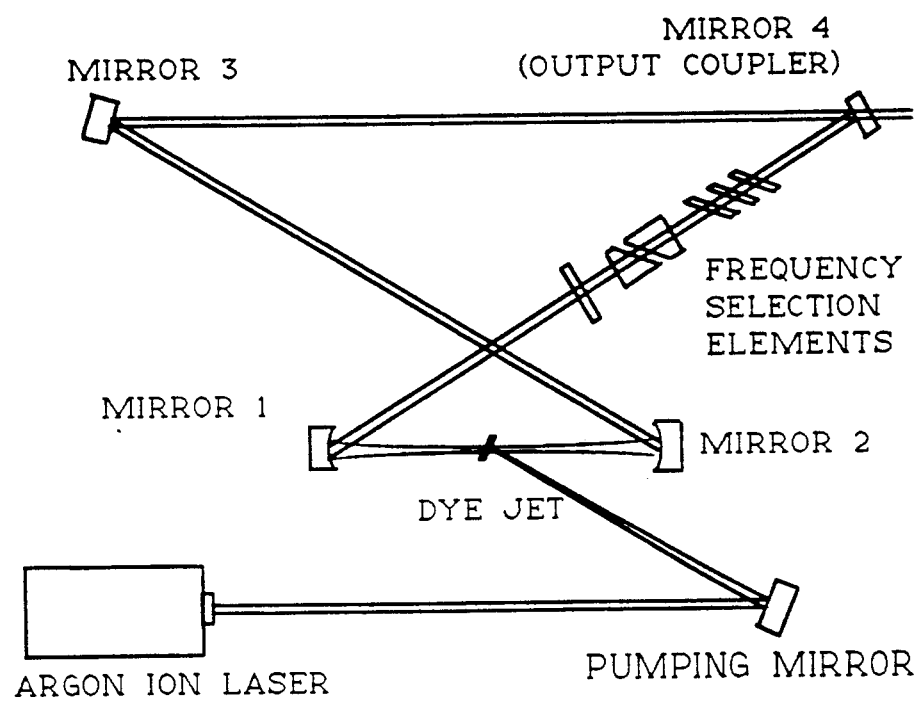
FIG. 3. A schematic diagram of the prior art; a typical ring dye laser with a 4-mirror resonator design using a liquid dye jet as the active lasing medium.
Figure 4:
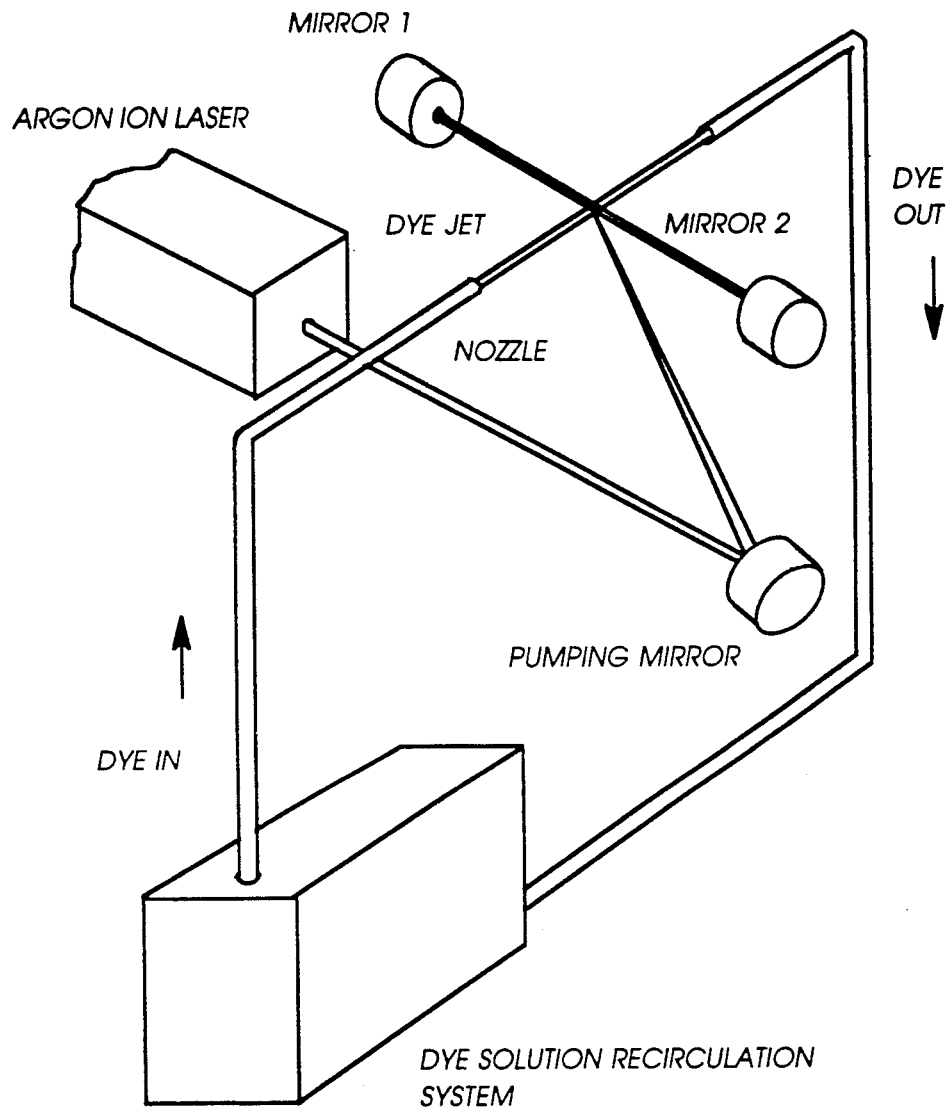
FIG. 4. The pump and recirculation system to produce a liquid dye jet in a typical tunable dye laser system.

The semiconductor nanocrystallite embedded glass has similar optical behaviors compared with that of dye liquids used in dye lasers. This invention intends to replace the liquid dye with the semiconductor nanocrystallite embedded glass disk as the tunable laser host. A conventional four mirror resonator liquid dye jet laser with laser pumping design is shown in FIG. 3. The dye jet is generated by a circulating system as shown in FIG. 4 in addition to the laser. The advantages of using semiconductor nanocrystallite embedded glass as the laser host are many. The most important one is that the glass ceramics can be prefabricated into a definite geometry. The host material can be modularized and can be replaced easily in case of maintenance or tuning range changes.

Figure 5:
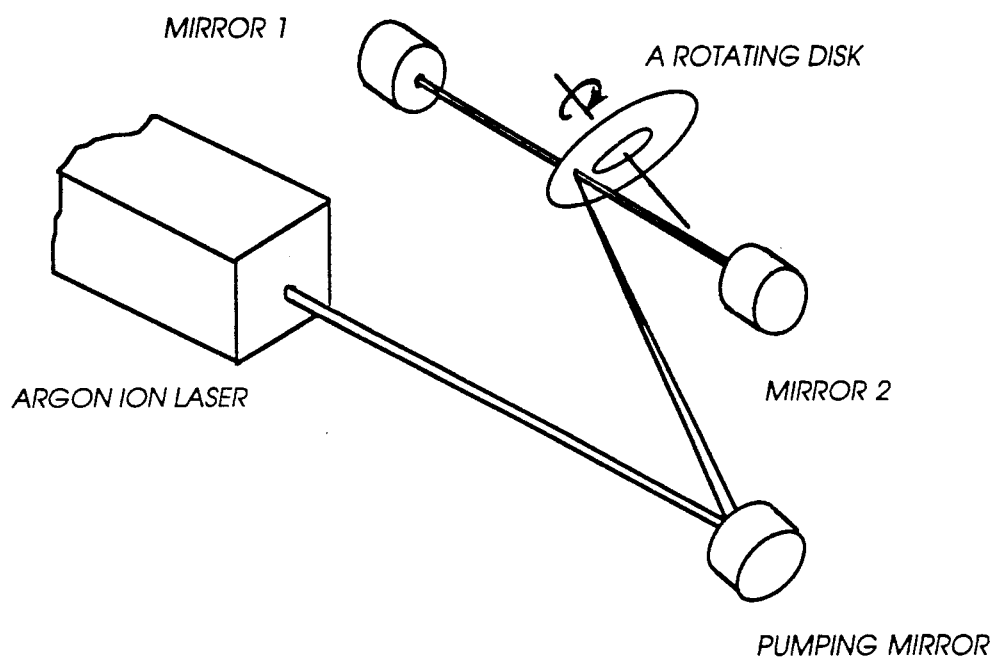
FIG. 5. A moving disk made of semiconductor nanocrystallite embedded glass replaces the liquid dye jet and recirculation system in a tunable dye laser system.

After the said glass ceramics is fabricated into the desired shape, e.g., a six centimeter diameter, and 0.5 mm disk (a detailed drawing is shown in FIG. 5), the disk is mounted onto a speed controlled induction motor. The disk and the motor can be mounted into a dye laser system replacing the dye jet as the active media of dye laser system. The orientation of the disk with respect to the laser alignment should be similar to that of the liquid dye film in the prior art.

What is claimed is:

1. A glass-ceramic article containing an embedded semiconductor nanocrystallite as the predominant crystal phase which can be prepared from a precursor glass capable of being melted at a temperature no higher than 1600° C., and which can be precipitated during cooling; said glass-ceramic article consisting essentially, expressed in terms of weight percent on the oxide basis, of 40-75% $SiO_2$, 0 to 50% $B_2O_3$, 0-15% $Li_2O$, 0-15% $Na_2O$ and/or $K_2O$, 0-20% ZnO, and 0.0001-5.0% of said semiconductor nanocrystallite; and wherein the semiconductor nanocrystallite is selected from the group consisting of: $ZnS_xSe_{1-x}$, $CdS_xSe_{1-x}$, $CuCl_xBr_{1-x}$, $ZnS_xTe_{1-x}$, $ZnSe_xTe_{1-x}$, InP, $Al_xGa_{1-x}As$, GaInAsP, AlGaAsSb, InAsSbP, and AlGaInP, where $x = 0$ to 1.

2. A glass-ceramic article containing an embedded semiconductor nanocrystallite as the predominant crystal phase which can be prepared from a precursor glass capable of being melted at a temperature no higher than 1600° C. and which can be crystallized in a uniform crystal orientation by applying an external electrical field during cooling; said glass-ceramic article consisting essentially, expressed in terms of weight percent on the oxide basis, of 40-75% $SiO_2$, 0 to 50% $B_2O_3$, 0-15% $Li_2O$, 0-15% $Na_2O$ and/or $K_2O$, 0-20% ZnO, and 0.0001-5.0% of said semiconductor nanocrystallite; and wherein then semiconductor nanocrystallite is selected from the group consisting of: $ZnS_xSe_{1-x}$, $CdS_xSe_{1-x}$, $CuCl_xBr_{1-x}$, $ZnS_xTe_{1-x}$, $ZnSe_xTe_{1-x}$, InP, $Al_xGa_{1-x}As$, GaInAsP, AlGaAsSb, InAsSbP, and AlGaInP, where x = 0 to 1.

3. The glass-ceramic article according to claim 1 is used as laser active media.

4. The glass-ceramic article according to claim 2 used as laser active media.

5. The glass-ceramic article according to claim 2 fabricated into a disk geometry with a diameter of 20-100 mm and a thickness of 0.02-2.5 mm for replacing the active region of liquid dye in dye laser systems as the lasing medium.

6. The glass ceramic article of claim 5 having a moving attachment allowing the disk to move rotationally and/or reciprocally during lasing.

* * * * *